United States Patent
Clemen et al.

(10) Patent No.: US 10,808,557 B2
(45) Date of Patent: Oct. 20, 2020

(54) NOZZLE ASSEMBLY FOR A COMBUSTION CHAMBER OF AN ENGINE

(71) Applicant: Rolls-Royce Deutschland Ltd & Co KG, Blankenfelde-Mahlow (DE)

(72) Inventors: Carsten Clemen, Mittenwalde (DE); Thomas Doerr, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 458 days.

(21) Appl. No.: 16/020,117

(22) Filed: Jun. 27, 2018

(65) Prior Publication Data

US 2019/0024518 A1    Jan. 24, 2019

(30) Foreign Application Priority Data

Jul. 21, 2017 (DE) .......... 10 2017 212 616

(51) Int. Cl.
    *F02C 7/22*    (2006.01)
    *F01D 9/04*    (2006.01)
    (Continued)

(52) U.S. Cl.
    CPC .......... *F01D 9/04* (2013.01); *F02C 7/22* (2013.01); *F02C 7/222* (2013.01); *F02C 7/228* (2013.01);
    (Continued)

(58) Field of Classification Search
CPC .. F02C 7/222; F02C 7/22; F02C 7/232; F02C 7/228; F02C 9/32; F23R 3/28;
(Continued)

(56) References Cited

U.S. PATENT DOCUMENTS 5,533,329 A * 7/1996 Ohyama .......... F23R 3/26
                                      60/39.27
5,901,549 A * 5/1999 Mandai .......... F02C 7/228
                                      60/737
(Continued)

FOREIGN PATENT DOCUMENTS

CN    102606314 A    7/2012
DE    19854908 A1    5/2000
(Continued)

OTHER PUBLICATIONS

European Search Report dated Dec. 13, 2018 for counterpart European Patent Application No. 18180786.8.
German Search Report dated Mar. 14, 2015 from counterpart German App No. 102017212616.7.

*Primary Examiner* — Steven M Sutherland
(74) *Attorney, Agent, or Firm* — Shuttleworth & Ingersoll, PLC; Timothy J. Klima

(57) ABSTRACT

A nozzle assembly group for a combustion chamber of an engine, with multiple nozzles for introducing fuel into the combustion chamber that are arranged next to each other, wherein each nozzle has a nozzle outlet opening and a fuel channel for conveying fuel in the direction of the nozzle outlet opening. According to the invention, it is provided that at least two different types of nozzles are provided, wherein the nozzles of different types have nozzle outlet openings with an identical cross section, and for predetermining different flow rates of fuel through the fuel channels of the nozzles of different types, a cross section of a fuel channel of one type of nozzle is different from a cross section of a fuel channel of another type of nozzle.

13 Claims, 8 Drawing Sheets

(51) Int. Cl.
*F23R 3/28* (2006.01)
*F23R 3/34* (2006.01)
*F02C 7/232* (2006.01)
*F02C 7/228* (2006.01)
*F02C 9/32* (2006.01)
*F23R 3/46* (2006.01)

(52) U.S. Cl.
CPC ............... *F02C 7/232* (2013.01); *F02C 9/32* (2013.01); *F23R 3/28* (2013.01); *F23R 3/286* (2013.01); *F23R 3/346* (2013.01); *F23R 3/46* (2013.01); *F23R 2900/00013* (2013.01); *F23R 2900/00014* (2013.01)

(58) Field of Classification Search
CPC .. F23R 3/286; F23R 3/346; F23R 3/46; F23R 2900/00013; F23R 2900/00014
See application file for complete search history.

(56) References Cited

U.S. PATENT DOCUMENTS

| | | |
|---|---|---|
| 2010/0297566 A1* | 11/2010 | Noiray ............... F23D 14/46 431/159 |
| 2011/0162370 A1 | 7/2011 | Kim et al. |
| 2012/0180487 A1 | 7/2012 | Uhm et al. |
| 2015/0159874 A1 | 6/2015 | Toon et al. |
| 2015/0219337 A1 | 8/2015 | Crothers et al. |
| 2016/0032842 A1 | 2/2016 | Isono et al. |
| 2016/0305337 A1 | 10/2016 | Crothers et al. |
| 2018/0187603 A1* | 7/2018 | Berry ............... F23R 3/286 |

FOREIGN PATENT DOCUMENTS

| | | |
|---|---|---|
| DE | 112014001594 T5 | 1/2016 |
| DE | 102016106984 A1 | 10/2016 |
| WO | WO2017123619 | 7/2017 |

* cited by examiner

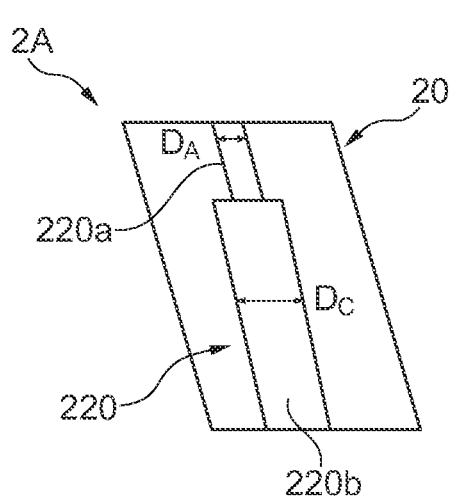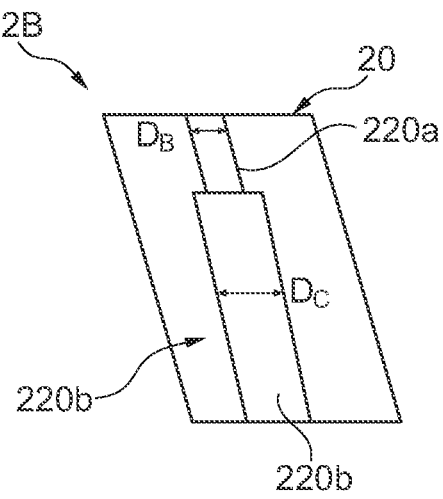
Fig. 1A    Fig. 1B
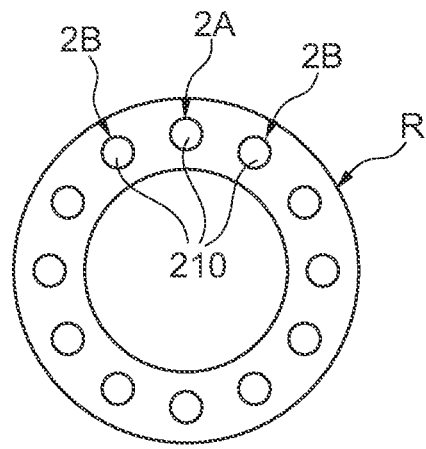
Fig. 1C

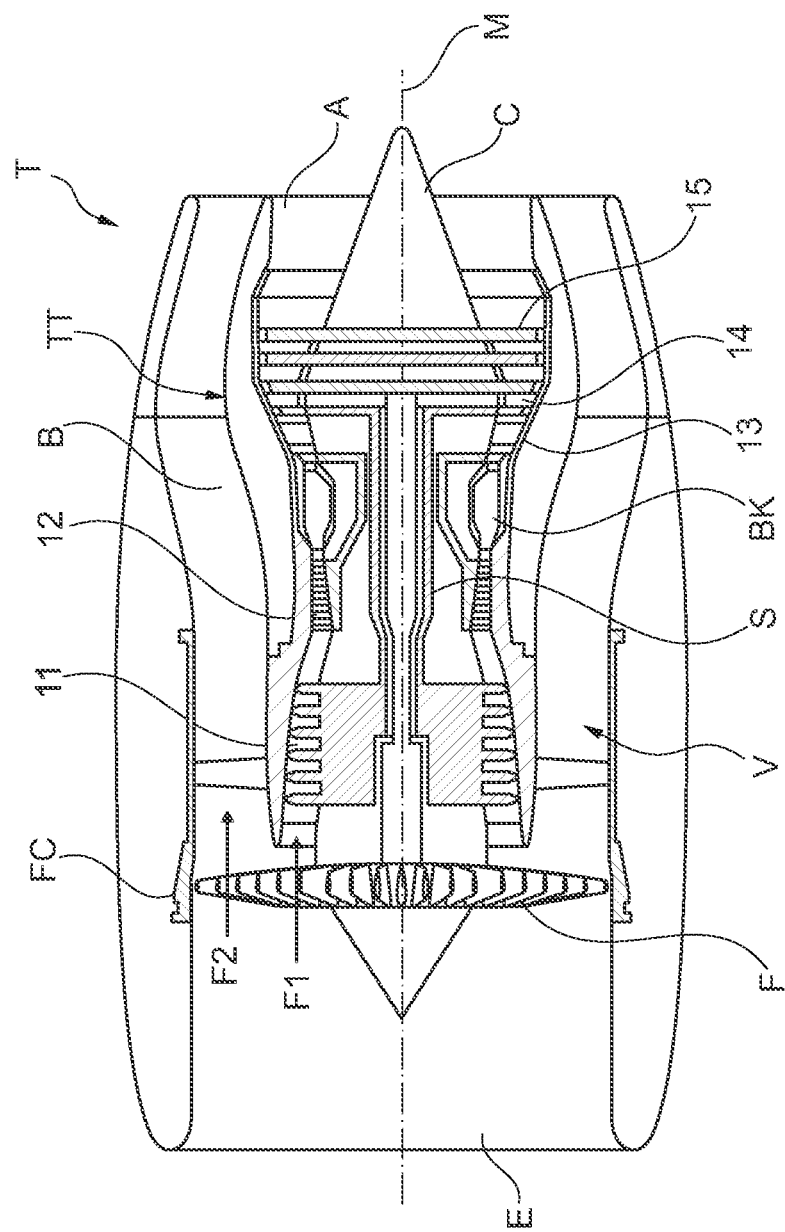

NOZZLE ASSEMBLY FOR A COMBUSTION CHAMBER OF AN ENGINE

This application claims priority to German Patent Application DE102017212616.7 filed Jul. 21, 2017, the entirety of which is incorporated by reference herein.

DESCRIPTION

The invention relates to a nozzle assembly group for a combustion chamber of an engine, in particular for an annular combustion chamber of a gas turbine engine.

Nozzle assembly groups for combustion chambers of an engine comprise multiple nozzles for introducing fuel into the combustion chamber, which are usually arranged next to each other along a circular line. In addition, the nozzles also serve for swirling the supplied air, which is subsequently conveyed, intermixed with the supplied fuel, into the combustion chamber at a nozzle outlet opening of the nozzle. In addition to the nozzle outlet opening, each nozzle in particular has a fuel channel for conveying fuel in the direction of the nozzle outlet opening. This fuel channel is connected to a fuel supply, for example in the form of a fuel manifold, outside a combustion chamber housing. The fuel channel extends inside the nozzle in the direction of the nozzle outlet opening. The fuel channel has a cross section which determines what amount of fuel can be maximally conveyed in the direction of the nozzle outlet opening. The cross section of the fuel channel thus determines the amount of fuel that is to be introduced into the combustion space via the respective nozzle. Such a nozzle assembly group is known from US 2015/0159874 A1, for example.

It is also known to form a fuel channel of each nozzle with different cross sections. Thus, for example a section with a cross section may be provided upstream of a fuel channel with respect to a flow direction of the fuel in the direction of the nozzle outlet opening, which is smaller than in a section of the fuel channel connecting thereto in the flow direction. At that, it is determined through the section with a smaller cross section what amount of fuel is supplied to the nozzle outlet opening of the nozzle via the section with a larger cross section connecting downstream. As in US 2015/0159874 A1, in practice the individual nozzles of a nozzle assembly group for a combustion chamber of an engine are configured so as to be identical to each other, in particular so as to have identical fuel channels. Thus, these are identical structural components with identical numbers of parts, which are then used for mounting a nozzle assembly group typically having 12, 14, 16, 18, 20 or 22 nozzles.

During the operation of an engine, for example in particular during takeoff, it may occur that the engine is operated in a range in which an air-fuel ratio of 0 to 20 is passed through. In such an operational range, considerable soot emissions may occur. Also, the nozzles of nozzle assemblies as they have been known so far tend to have undesired thermo-acoustic vibrations in the low-load operational range of the engine.

Against this background, the invention is based on the objective of providing an improved nozzle assembly group in which the previously mentioned disadvantages are avoided, or at least reduced.

This objective is achieved through a nozzle assembly group according to the present disclosure.

Here, it is suggested according to the invention that at least two different types of nozzles are provided, wherein
  the nozzles of different types have nozzle outlet openings with identical cross sections, but
  for the purpose of determining different flow rates of fuel through the fuel channels of the different types of nozzles, a cross section of a fuel channel of one type of nozzle differs from a cross section of a fuel channel of another type of nozzle.

Thus, a different flow rate for fuel through the respective fuel channel and thus in the direction of the nozzle outlet opening by means of the different cross sections in the different types of nozzles depending on the type of nozzle. In the case of a larger cross section, the amount of the fuel that can be conveyed through the fuel channel to the nozzle outlet opening, or that is set based on the same increases. What is usually understood by the cross section of a fuel channel of a nozzle is the smallest cross section of the fuel channel that determines the flow rate of fuel in the direction of the nozzle outlet opening. This does not affect the possibility that the fuel channel has section with different cross sections along its extension direction in the direction of the nozzle outlet opening section. However, ultimately it is the smallest cross section that determines the amount of fuel that is supplied to the nozzle outlet opening through the fuel channel. In the solution according to the invention now at least two different types of nozzles are provided, so that different amounts of fuel can be supplied into the combustion chamber via the respective different fuel channels at the identical nozzle outlet openings. In this manner, it can be achieved that a nozzle with a larger cross section is ultimately operated in a richer manner (although still with excess air and thus in a leaner manner), i.e. with a larger amount of fuel than a nozzle of another other type with a fuel channel of a smaller cross section. In this manner, the nozzles of the nozzle assembly group can be operated with different air-fuel ratios, in particular in such a manner that although the ratio of the air that is conveyed into the combustion chamber through all the nozzles to the fuel that is conducted into the combustion space through all nozzles, that is, the ratio of the total amount of air to the total amount of fuel remains constant in the combustion chamber, but the nozzles of the different types are operated with different air-fuel ratios. In this manner, the different types of nozzles can be respectively operated in ranges with a reduced soot emission, without any impact on the ratio of the total amount of air to the total amount of fuel in the combustion chamber, and thus on the thrust of the engine, occurring as a result.

Here, in one embodiment variant, the cross sections of the fuel channels of different types of nozzles are invariable, and thus cannot be altered. In this manner, each fuel channel determines the amount of the fuel to be conveyed to the nozzle outlet opening with an unalterable amount (inside the respective fuel channel) through a respective minimum cross section. The amount of the fuel to be conveyed to a nozzle outlet opening inside the nozzle is thus respectively preset inside the nozzle based on the smallest cross section of the fuel channel that is provided upstream of the nozzle outlet opening.

In one embodiment variant, a fuel channel of at least one type of nozzle comprises at least two sections with different cross sections. The smallest cross section of a fuel channel of this type of nozzle differs from the smallest cross section of a fuel channel of another type of nozzle. Thus, the nozzles of different (first and second) type can also comprise sections that have a cross section that in a first type of nozzle is identical to the cross section of a section of another type of nozzle. However, for determining different flow rates via the fuel channel it is then further provided that the (smallest)

cross sections of the fuel channels of the nozzles of different types that are significant in this context are different from each other.

With respect to a reference cross section, a cross section of a fuel channel of the one (first) type of nozzle can for example be smaller by at least 3% than the reference cross section. Further, a cross section of a fuel channel of the other (second) type of nozzle can be larger by at least 7% than a cross section of the fuel channel of the one (first) type, which is at least locally narrower in this respect. The (smallest or medium) cross sections of the fuel channels of the nozzles of different types thus differ measurably, so that different amounts of fuel and thus air-fuel mixtures of different ratios are injected at the nozzles of different types during operation of the engine.

In particular with respect to a reduction of soot emissions as well as to maintaining a constant thrust, it can be advantageous to restrict the differences in cross sections. Thus, it is for example provided in one embodiment variant that a cross section of a fuel channel of the one (first) type of nozzle is smaller by maximally 5% than a predetermined reference cross section, while a cross section of a fuel channel of the other (second) type of nozzle is larger by maximally 10% than the cross section of the one (first) type of nozzle.

At that, a reference cross section can for example be in the range of $0.75 \text{ mm}^2$ to $20 \text{ mm}^2$, in particular in the range of $2.5 \text{ mm}^2$ to $3.9 \text{ mm}^2$. Thus, the minimum cross sections of a fuel channel of a nozzle restricting the amount of fuel to be provided vary, for example depending on the engine. For example, in the nozzle assemblies with identically configured nozzles as they are known from the state of the art, the fuel channels have a uniform minimum cross section in the range of 2 mm throughout. What is now proposed in one embodiment variant is a nozzle assembly group in which a (smallest or medium) cross section of the one type of nozzle has a medium diameter in the range of 1.85 mm to 1.95 mm, while a (smallest or medium) cross section of the other type of nozzle has a medium diameter in the range of 2.05 mm to 2.15 mm. To take up the previously specified percentile relationships, the diameter of a reference cross section could thus be in the range of approximately 2 mm, for example. A cross section of a fuel channel of the one (first) type of nozzle with approximately 1.9 mm would then also be smaller by no more than 5% than the reference cross section of 2 mm. Analogously, in that case a larger cross section of a fuel channel of the other (second) type of nozzle for example has a diameter of approximately 2.1 mm, and is thus larger by less than 10% than the cross section of the other (first) type of nozzle.

In one embodiment variant, at least three different types of nozzles are provided that respectively differ from each other with respect to the (smallest) cross section of a respective fuel channel. In this manner, different flow rates of fuel through the fuel channels of the nozzles of the at least three different types can be determined. For example, different amounts of fuel are determined through the respective cross section depending on the type of nozzle, thus for example two or three different flow rates in the case of two or three different types of nozzles.

The nozzles of different types, in particular their nozzle outlet openings, are for example arranged next to each other along a circular line. Such an arrangement is in particular suitable for use in a ring-shaped combustion chamber of a gas turbine engine.

The nozzle outlet openings of the nozzles of different types can for example be arranged equidistantly next to each other, in particular along the circular line that has already been mentioned above. Each nozzle outlet opening is thus arranged centrally with the same distance to two adjacent (right and left) nozzle outlet openings, independently of the type of the respective nozzle comprising the nozzle outlet opening.

In one embodiment variant, the nozzle outlet openings of the nozzles of different types can be arranged in a manner unevenly distributed next to each other. Such an uneven distribution in particular includes that different distances between adjacent nozzle outlet openings are present, as well as that the nozzle outlet openings of the different nozzles are arranged with different frequencies, e.g. along a circular line. What is for example provided in the latter case is a pair of nozzle outlet openings of two nozzles of a first type that are positioned (more) closely to each other. In that case, this pair is present with a larger distance (as compared to the distance between the two nozzle outlet openings of the first type) to at least one adjacent nozzle outlet opening of another, second type of nozzle. A distance between two nozzle outlet openings of the same type can be smaller (or larger) than a distance of two nozzle outlet openings of different types. Thus, through the arrangement of the nozzle outlet openings in interaction with the different air-fuel ratios, the combustion in the combustion space and the soot emissions generated in the process can be set in a targeted and very variable manner.

In one variant, nozzle outlet openings of nozzles of different types alternate. In this manner, for example a nozzle outlet opening of a type of nozzle is followed by a nozzle outlet opening of another type of nozzle. In other words, a nozzle outlet opening of a nozzle of one type is always provided adjacent to a nozzle outlet opening of a nozzle of other type.

In one embodiment variant, a flow control is associated with at least one type of nozzle and arranged upstream of the fuel channel. By means of the flow control, an amount of fuel that is to be supplied to the fuel channel can be adjusted. At that, the cross section of the fuel channel that is formed in a rigid manner in a nozzle is not varied, but the amount of fuel supplied to a fuel channel is. Therefore, such a flow control can for example also be located outside of a combustion chamber housing at which the individual nozzles of the nozzle assembly group are (radially) internally attached.

In a further development based thereon, the use of a flow control is associated with a type of nozzle that has the fuel channel with the largest cross section. Via the flow control that is arranged upstream of the fuel channel, the amount of the supplied fuel upstream of the fuel channel can then be reduced to a measure which substantially corresponds to the flow rate that can be conveyed at the nozzle outlet opening via the fuel channel of a nozzle of another type having the smallest cross section. Here, the flow control can for example have a supply channel that is variable with respect to its cross section. The cross section of this supply channel can for example be set to the smallest cross section of the other type of nozzle, so that ultimately the flow rate of fuel through all nozzles is identical independently of their type. The setting of an uneven distribution of the fuel supplied to the combustion chamber supplied via the individual nozzles of the nozzle assembly group, which can be advantageous for soot reduction and the reduction of thermo-acoustic vibrations especially in the low-load range of an engine, can thus be turned off via the flow control as needed, for example for the high-load range of the engine, and thus for example during the cruise flight of an aircraft that is provided with the engine.

A flow control for setting the amount of fuel which can be supplied to the fuel channel can for example comprise an independently controllable passive valve appliance and/or an electrically controllable active valve appliance. This particularly also includes an embodiment variant in which one or multiple valve appliances of the flow control are arranged outside of the respective nozzle. For example, the at least one valve appliance of the flow control by means of which the amount of fuel that is to be supplied to the respective fuel channel of the nozzle can be variably adjusted, is arranged at a (radially) outer side of a combustion chamber housing, while the associated nozzle is provided with a fuel channel on a (radially) inner side of a combustion chamber housing.

The accompanying Figures illustrate possible embodiment variants of the proposed solution by way of example.

Herein:

FIG. 1A shows, in sections, a nozzle of a first type for an exemplary embodiment of a nozzle assembly group;

FIG. 1B shows, in a view corresponding to FIGS. 1A and 1n sections, a nozzle of a second type with a fuel channel of a larger cross section;

FIG. 1C shows a combustion chamber ring of the nozzle assembly group with multiple nozzles of different types;

FIG. 6A shows an engine in which a combustion chamber with a nozzle assembly group is used;

Figure 2:
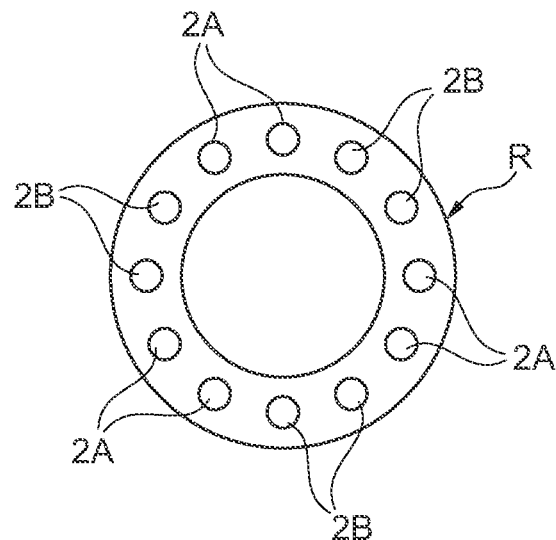
FIG. 2 shows a combustion chamber ring corresponding to FIG. 1C with a differing arrangement of nozzles of different types.

FIG. 6A illustrates, schematically and in sectional view, a (turbofan) engine T in which the individual engine components are arranged behind each other along a rotational axis or central axis M, and the engine T is configured as a turbofan engine. At an inlet or intake E of the engine T, air is suctioned in along an entry direction by means of a fan F. This fan F, which is arranged in a fan housing FC, is driven by means of a rotor shaft RS that is set into rotation by a turbine TT of the engine T. Here, the turbine TT connects to a compressor V, which for example has a low-pressure compressor 11, and a high-pressure compressor 12, as well as possibly also a medium-pressure compressor. The fan F supplies air to the compressor V in a primary air flow F1, on the one hand, as well as, on the other hand, to the secondary flow channel or bypass channel B in a secondary air flow F2 for creating a thrust. Here, the bypass channel B extends about a core engine that comprises the compressor V and the turbine TT as well as a primary flow channel for the air that is supplied to the core engine by the fan F.

The air that is conveyed via the compressor V into the primary flow channel reaches a combustion chamber section BK of the core engine, where the driving power for driving the turbine TT is generated. For this purpose, the turbine TT has a high-pressure turbine 13, a medium-pressure turbine 14, and a low-pressure turbine 15. Here, the turbine TT drives the rotor shaft RS and thus the fan F by means of the energy released during combustion in order to create the required thrust by means of the air that is conveyed into the bypass channel B. The air from the bypass channel B as well as the exhausts from the primary flow channel of the core engine are discharged via an outlet A at the end of the engine T. Here, the outlet A usually has a thrust nozzle with a centrally arranged outlet cone C.

Figure 6B:
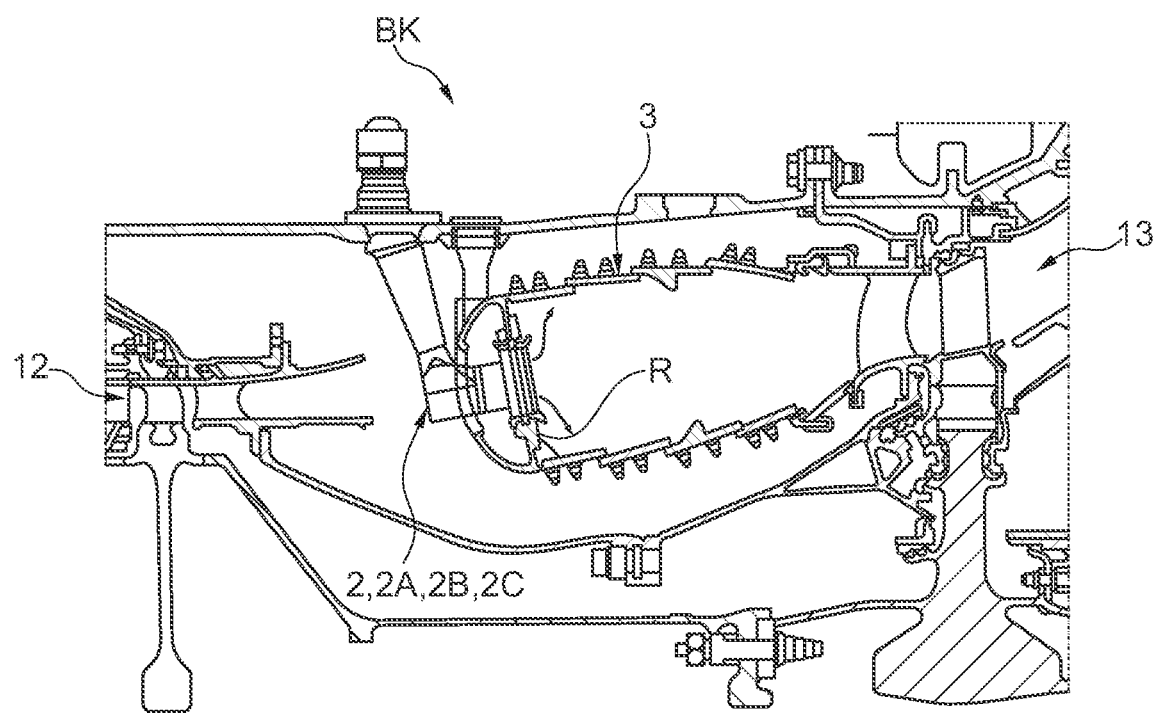
FIG. 6B shows, in sections and in an enlarged scale, the combustion chamber with a nozzle of a nozzle assembly group.

FIG. 6B shows a longitudinal section through the combustion chamber section BK of the engine T, in particular depicting the (annular) combustion chamber 3 of the engine T. A nozzle assembly group is provided for injecting fuel or an air-fuel mixture into the combustion chamber 3. It comprises a combustion chamber ring R at which multiple (fuel nozzles 2 or 2A, 2B, 2C are arranged along a circular line about the central axis M. Here, the nozzle outlet openings of the respective nozzles 2, 2A, 2B, 2C that are located inside the combustion chamber 3 are provided at the combustion chamber ring R. Here, each nozzle 2, 2A, 2B, 2C comprises a flange 22, via which a nozzle 2, 2A, 2B, 2C is screwed to a combustion chamber housing of the combustion chamber 3.

Figure 7A:
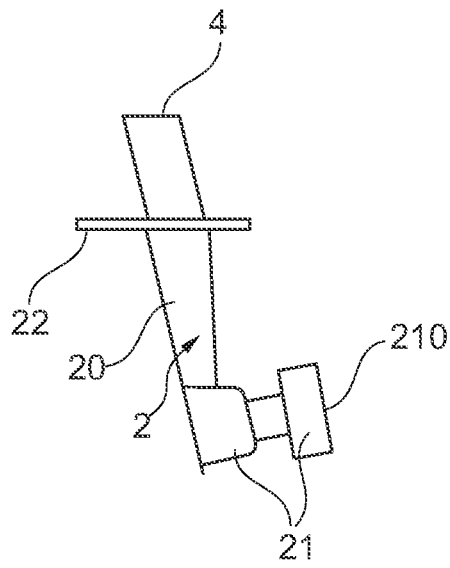
FIGS. 7A-7C show, in views that correspond to the FIGS. 1A to 1C, a valve as it is known from the state of the art and a combustion chamber ring of a nozzle assembly group provided with such a valve.
Figure 7B:
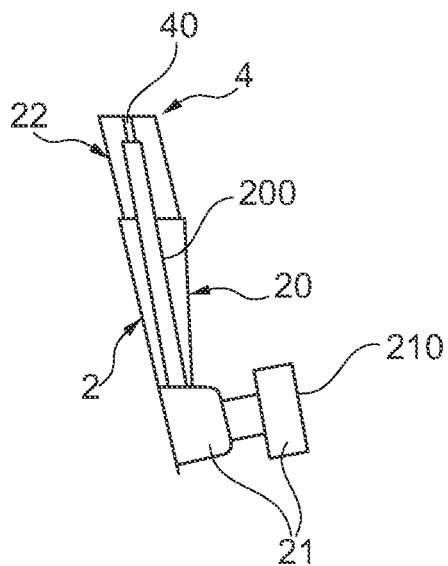
Figure 7C:
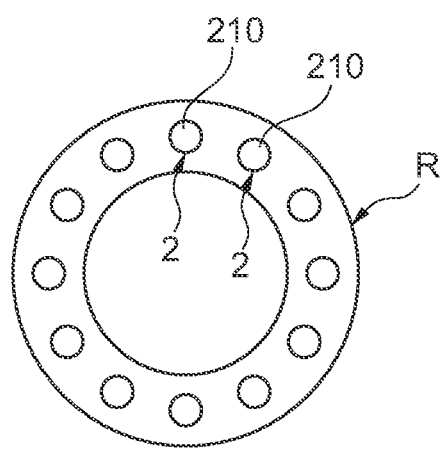

A structure of a nozzle 2 as it is known from the state of the art and a nozzle assembly group formed with the same are illustrated in more detail in FIGS. 7A, 7B and 7C. In addition to the flange 22 for fixation at the combustion chamber housing, each nozzle 2 comprises distribution/mixing elements 21 for swirling the air and for admixing the fuel, so that the desired air-fuel mixture can be output at a nozzle outlet opening 210 of the nozzle 2. The distribution/mixing elements 21 are connected to the flange 22 by means of a stem 20 of the nozzle 2. A fuel channel 220 is formed inside this stem 20, with the fuel being conveyed through it in the direction of the nozzle outlet opening 210. Outside of the combustion chamber housing, a fuel supply 4, for example in the form of a fuel manifold, is provided. This fuel supply 4 has an interface for coupling at the stem 20, so that a supply channel 40 of the fuel supply 4 can be connected to the fuel channel 200 of the nozzle 2 in order to supply fuel from the fuel supply 4 to the fuel channel 200 of the nozzle 2.

According to the cross-sectional rendering of FIG. 7B, a section with a reduced cross section can be provided at the supply channel 40 at the upstream beginning of the supply channel 40 to set a certain flow rate of fuel in the direction of the nozzle outlet opening 210. Such a narrowed diameter can also be provided at a section of the fuel channel 200 of the nozzle 2 itself. At that, the respectively narrowed range with a reduced cross section varies depending on the engine T.

Figure 5:
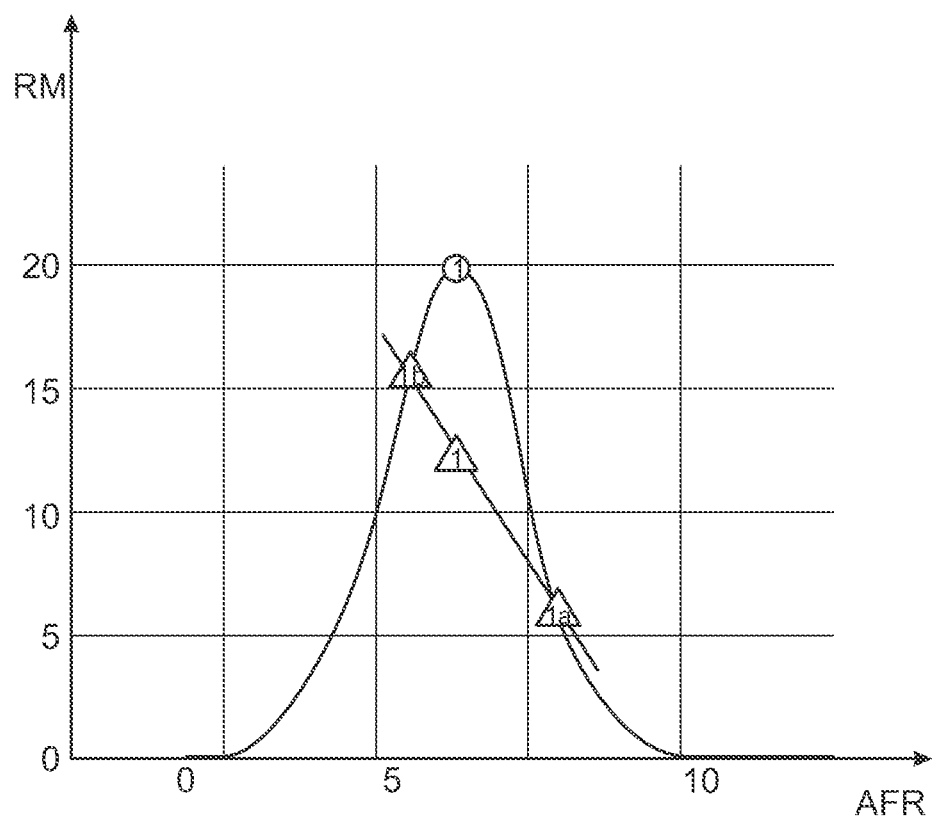
FIG. 5 shows a diagram in which a trajectory for the resulting amount of soot is plotted against the air-fuel ratio.

In a nozzle assembly group as it is known from the state of the art, identically configured nozzles 2 are provided in a manner distributed about the circumference along a circular line at the combustion chamber ring R, corresponding to FIG. 7C. The individual nozzles 2 do not differ form each other structurally and also have identical fuel channels 220. If now the engine T is also driven in an operational range, in which an air-fuel ratio AFR passes through a range of 0 to 20, for example during the startup of the engine T, high soot emissions may occur. This may for example be seen based on the diagrams of FIG. 5 in which the amount of soot RN is plotted against the air-fuel ratio AF. During startup of the engine T, in particular the maximum of the shown trajectory is passed (point "1" in the circle). Moreover, the nozzles 2 in a nozzle assembly group of the state of the art corresponding to FIGS. 7A to 7C are prone to thermo-acoustic vibrations in a low-load range.

In contrast to the FIGS. 7A to 7C of the solution as it is known from the state of the art, in one embodiment variant of FIGS. 1A to 1C it is provided that nozzles 2A and 2B of different types are used in a nozzle assembly group, differing from each other with respect to the smallest diameters of their respective fuel channel 220. Thus, the amount of fuel that is to be supplied to the nozzle outlet opening 210 is adjusted based on the respective smallest cross section of a fuel channel 220. By enlarging or diminishing this cross section, the air-fuel ratio AFR is shifted to the right or left of the maximum value in the (theoretical) trajectory of FIG. 5 for each nozzle 2A, 2B. For the total ratio, i.e. the ratio of the total air to the total amount of fuel in the combustion chamber 3 and thus the engine thrust to remain constant, nozzles 2A with a fuel channel 220 having a locally decreased cross section—as compared to a reference cross section—and nozzles 2B with a fuel channel having a locally decreased cross sections are provided in the different types of nozzles 2A and 2B. These nozzles 2A and 2B alternate across the circumference of the combustion chamber ring R corresponding to FIG. 1C. At that, the nozzles 2A and 2B of different types have nozzle outlet openings 210 of an identical diameter. However, the amount of fuel that is to be supplied to the nozzle outlet opening 210 is adjusted differently through the different design of the respective fuel channels 220.

In a nozzle 2A of a first type corresponding to FIG. 1A as well as in a nozzle 2B of a second type corresponding to FIG. 1B, the fuel channel 220 has successive cable sections 220a and 220b with different cross sections. A respective first cable section 220a that is located upstream with respect to the flow direction of the fuel in the direction of the nozzle outlet opening 210 is narrowed as compared to a subsequent second cable section 220b. Here, this first cable section 220a with the smallest cross section determines the amount of fuel. At that, a diameter DA, DB of the first cable section 220a is in the range of approximately 50% of a diameter DC of the second cable section 220b of the fuel channel 220. In the present case, the lengths of the first and second cable sections 220a and 220b are identical in the nozzles 2A and 2B of different types. Likewise, the diameter DC of the second cable section 220 that is present in the direction of the nozzle outlet opening 210 on the first cable section 220a is identical for the nozzles 2A and 2B of both different types.

However, the diameter $D_A$ of the first cable section 220a in a nozzle 2A of the first type corresponding to FIG. 1A can for example be approximately 1.9 mm. The diameter $D_A$ is thus smaller by at least 3.5%, but maximally by 5% than a reference diameter that lies at 2 mm (and thus belongs to a reference cross section of approx. 3.14 mm²). In a nozzle 2B of the other, second type, the diameter $D_B$ and thus the smallest cross section of the first cable section 220a that determines the amount of fuel differs from the diameter $D_A$ of the nozzle 2A of the first type. In the nozzle 2B of the second type, the diameter $D_B$ is 2.1 mm and is thus larger by at least 7% and maximally by 10% than the diameter $D_A$ of the nozzle 2A of the first type.

Based on the different diameters $D_A$ and $D_B$ of the two different nozzle types that determine the amount of fuel, the one nozzle 2A is operated with a larger air-fuel ratio AFR than the nozzle 2B of the other type, which is thus operated in a richer manner. Nevertheless, overall the total amount of fuel that is introduced into the combustion chamber 3 via the nozzle assembly group is not different (to a relevant extent) with respect to a nozzle assembly group from the state of the art with identical nozzles 2.

Thus, in a nozzle assembly group of the embodiment variant of FIGS. 1A to 1C, nozzles 2A, 2B of different types are used, alternating along the combustion chamber ring R, so that, for example in the case of a total number of twelve nozzles 2A, 2B, six nozzles 2A of the one, first type and six nozzles 2B of the other, second type are provided. Due to the different diameters $D_A$ and $D_B$ and thus the different cross sections, the nozzles 2A, 2B of different types determining the amount of fuel to be supplied are operated with different air-fuel ratios AFR. Presently, in the case of the nozzles 2A of the first type, the operating points are located right of the apex corresponding to FIG. 5 (in a point "1 a" in the diagram of FIG. 5), while the operating points of the nozzles 2B of the second type that are operated in a richer manner are located left of the apex (in a point "1 b" in the diagram of FIG. 5). The emissions of the nozzle assembly group can thus be significantly reduced with respect to the solution with identical nozzles 2 of FIG. 7C as it is known form the state of the art. For example, an averaged value for an amount of soot from both nozzle types lies in a maximum range of about 30% below the amount of soot of a nozzle assembly group of the state of the art. Besides, the thermo-acoustic sensitivity strongly depends on the (local) air-fuel ratio AFR at the individual nozzles 2A, 2B. Thus, the use of different types of nozzles 2A, 2B also leads to a detuning of the adjacent nozzles 2A, 2B with respect to each other, so that their thermo-acoustic behavior is changed, and thus the proneness to vibrations or the vibration amplitudes are positively influenced.

Figure 3:
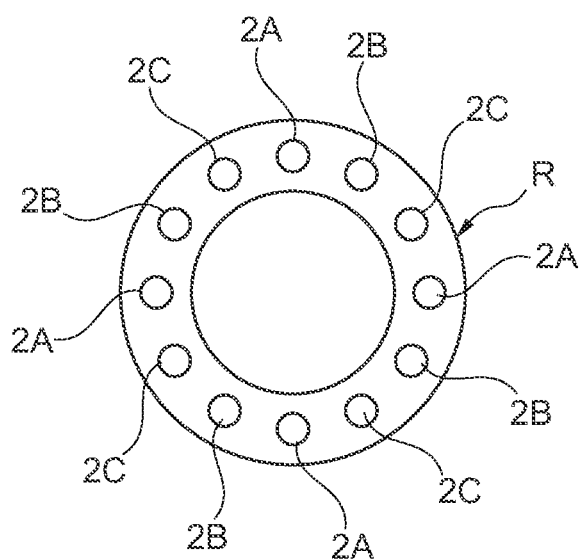
FIG. 3 shows a further combustion chamber ring corresponding to FIG. 1C with a differing arrangement of nozzles of different types.

As is illustrated based on FIGS. 2 and 3 with a view to a combustion chamber ring R of possible alternative embodiment variants of a nozzle assembly group, the nozzles 2A and 2B do not necessarily have to alternate. Further, also more than two different types of nozzles 2A, 2B and 2C can be provided, respectively differing from each other with respect to the cross sections of their fuel channels 220 which determine the amount of fuel.

In the variant of FIG. 2A, respectively nozzles 2A and 2B of different types are arranged in pairs, for example. Correspondingly, two nozzles 2A, 2A of one type (a pair of nozzles 2A/2A) that are positioned next to each other are followed by two nozzles 2B, 2B of the other type (a pair nozzles 2B/2B).

In the variant of FIG. 3, three different types of nozzles 2A, 2B and 2C are provided which are arranged so as to be alternating along the combustion chamber ring R. Here, nozzles 2A, 2B or 2C of the same type are provided at every third position, so that for example respectively four nozzles 2A, 2B and 2C of one type are present in the case of a total number of twelve nozzles of a nozzle assembly group.

Figure 8:
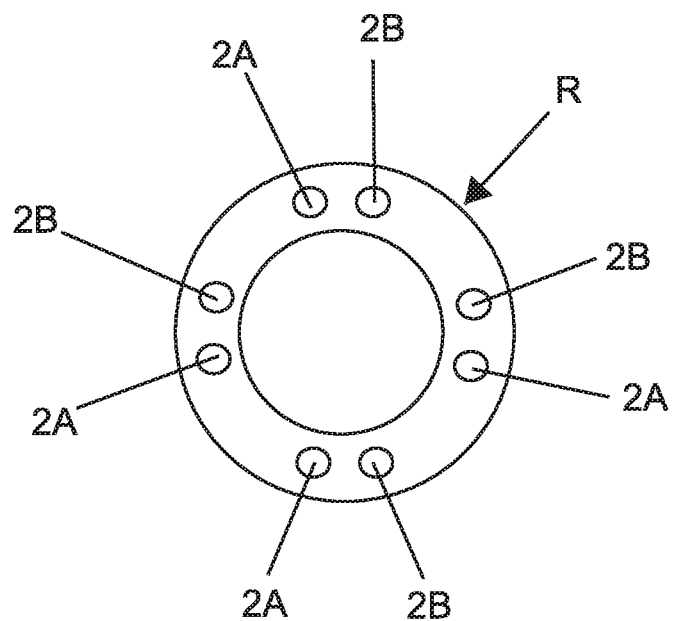
FIG. 8 shows a combustion chamber ring corresponding to FIG. 1C with an uneven arrangement of nozzles of different types.

In contrast to the renderings in FIGS. 1C, 2 and 3, in which the individual nozzles 2A, 2B, 2C of a nozzle assembly group are arranged equidistantly at the combustion chamber ring R, in possible further developments nozzles of different types can also be provided in a manner distributed unevenly at the combustion chamber ring R. See FIG. 8, far example.

Figure 4A:
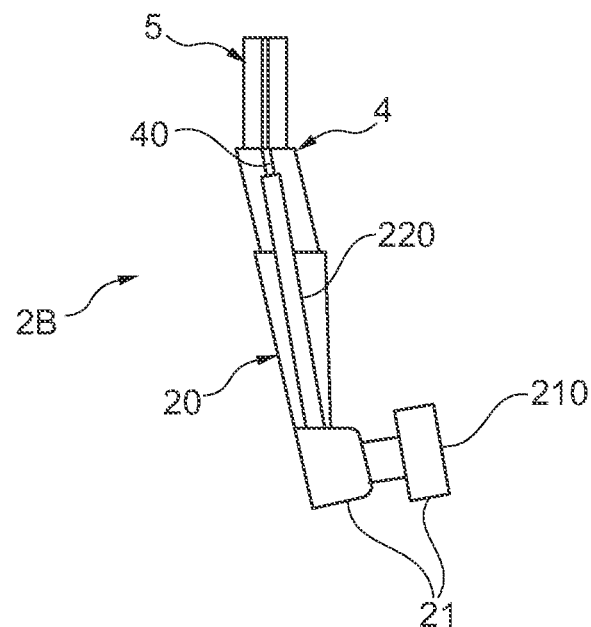
FIGS. 4A-4B show a further embodiment variant of a nozzle for a nozzle assembly group, in which a flow control is arranged upstream of the nozzle of the shown type so as to vary an amount of fuel to a fuel channel of the nozzle.
Figure 4B:
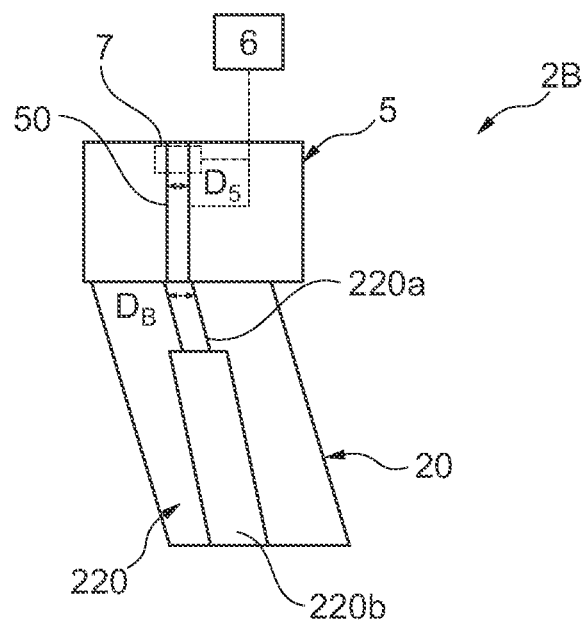

Further, in a further development corresponding to FIGS. 4A and 4B, a flow control 5 is assigned to nozzle 2B, which is shown by way of example. By means of this flow control 5, the amount of fuel that is supplied to the fuel channel 220 of the nozzle 2B can be variably adjusted. For example, an uneven distribution of the fuel via the nozzles 2A, 2B of different types across the circumference of the combustion chamber ring R and thus of the combustion chamber 3 is not desired for a high-load range during operation of the engine T. For this purpose, at a nozzle 2B of the second type, the flow control 5 is arranged upstream of the first cable section 220a with the narrowest cross section in order to separately regulate the flow rate of fuel, and thus to adjust it to be identical to a flow rate as it is determined by the smallest cross section of the fuel channel 220 of the first type of nozzle 2A. Thus, the cross sections and the diameters $D_A$, $D_B$ of the fuel channels 220 of the nozzles 2A and 2B of different types are not variable. However, now the flow rate of fuel can be regulated in such a manner through the flow control 5 arranged upstream of the one type of nozzle 2B that identical amounts of fuel are supplied to the nozzle outlet openings 210 of the different types of nozzles 2A, 2B.

For this purpose, the flow control 5 can have a variable supply channel 50. This supply channel 50, via which fuel is supplied to the fuel channel 220 of the nozzle 2B, can have a variable cross section. Thus, a diameter $D_5$ of this supply channel 50 can for example be set in a variable manner depending on the operational range of the engine T. Alternatively or additionally, the flow control 5 has at least one valve appliance for controlling the flow rate to a fuel channel 220 of the nozzle 2B. Such a valve appliance can be controlled depending on the pressure, and can thus be passive. Likewise, such a valve appliance can be controlled electrically, and can thus be active. Accordingly, the valve appliance 7 can comprise a pressure-dependent valve or an actively selectable valve.

For a targeted variable control of the flow rate via the flow control 5, flow control electronics 6 may be provided. This provides the amount of fuel that is to be supplied to a respective fuel channel 220 of a nozzle 2B by means of the flow control 5 depending on the respective operational range of the engine T. For this purpose, the flow control electronics 6 for example controls an adjusting movement of a side wall of the supply channel 50 to alter its diameter $D_5$, and/or a valve appliance 7.

PARTS LIST 11 low-pressure compressor
12 high-pressure compressor
13 high-pressure turbine
14 medium-pressure turbine
15 low-pressure turbine
2, 2A, 2B, 2C nozzle
20 stem
21 swirling/mixing element
210 nozzle outlet opening
22 flange
220 fuel channel
220a, 220b cable section
3 (annular) combustion chamber
4 fuel supply
40 supply channel
5 flow control
50 variable supply channel
6 flow control electronics
7 valve appliance
A outlet
B bypass channel
BK combustion chamber section
C outlet cone
$D_A$, $D_B$, $D_C$, $D_5$ (medium) diameter
E inlet/intake
F fan
F1, F2 fluid flow
FC fan housing
M central axis/rotational axis
R combustion chamber ring
S rotor shaft
T (turbofan) engine
TT turbine
V compressor

The invention claimed is:

1. A nozzle assembly group for a combustion chamber of an engine, comprising:
a plurality of nozzles for introducing fuel into the combustion chamber, the plurality of nozzles being arranged next to each other, wherein each of the plurality of nozzles includes a nozzle outlet opening and a fuel channel for conveying fuel in the direction of the nozzle outlet opening,
wherein the plurality of nozzles includes first and second types of nozzles, wherein
the first and second types of nozzles have nozzle outlet openings with an identical cross section, and
for determining different flow rates of fuel through the fuel channels of different types of nozzles, a cross section of a fuel channel of the first type of nozzles differs from a cross section of a fuel channel of the second type of nozzles;
a flow control assigned to one chosen from the first and second types of nozzles and by which an amount of fuel supplied to the fuel channel is adjusted;
wherein the flow control is assigned to the one chosen from the first and second types of nozzles that has the fuel channel with a largest cross section and is positioned upstream of only the one chosen from the first and second types of nozzles that has the fuel channel with the lamest cross section.

2. The nozzle assembly group according to claim 1, wherein the fuel channel of the one chosen from the first and second types of nozzles comprises at least two sections with different cross sections, and the smallest cross section of the fuel channel differs from a smallest cross section of the fuel channel of another chosen from the first and second types of nozzles.

3. The nozzle assembly group according to claim 1, wherein, with respect to a reference cross section, a cross section of the fuel channel of one of the first and second types of nozzles is smaller by at least 3% than the reference cross section, while a cross section of the fuel channel of the other of the first and second types of nozzles is larger by at least 7% than the cross section of the fuel channel of the one of the first and second types of nozzles.

4. The nozzle assembly group according to claim 3, wherein the reference cross section is in a range of 0.75 mm² to 20 mm².

5. The nozzle assembly group according to claim 4, wherein the reference cross section is in a range of 2.5 mm² to 3.9 mm².

6. The nozzle assembly group according to claim 1, wherein, with respect to a reference cross section, a cross section of the fuel channel of one of the first and second types of nozzles is smaller by maximally 5% than the reference cross section, while a cross section of the fuel channel of the other of the first and second t es of nozzles is larger by maximally 10% than the cross section of the fuel channel of the one of the first and second types of nozzles.

7. The nozzle assembly group according to claim 1, wherein a cross section of one of the first and second types of nozzles has a medium diameter in a range of 1.85 mm to 1.95 mm, and a cross section of the other of the first and second types of nozzles has a medium diameter in a range of 2.05 mm to 2.15 mm.

8. The nozzle assembly group according to claim 1, wherein the plurality of nozzles includes a third type of nozzles, with each of the first, second and third types of nozzles having respective fuel channels with cross sections differing from each other, so that at least three different flow rates of fuel are determined by the fuel channels of the first, second and third types of nozzles.

9. The nozzle assembly group according to claim 1, wherein the first and second types of nozzles are arranged next to each other along a circular line.

10. The nozzle assembly group according to claim 1, wherein the nozzle outlet openings of the first and second types of nozzles are arranged equidistantly next to each other.

11. The nozzle assembly group according to claim 1, wherein the nozzle outlet openings of the first and second types of nozzles are arranged so as to be distributed unevenly next to each other.

12. The nozzle assembly group according to claim 1, wherein the nozzle outlet openings of the first and second types of nozzles are arranged alternatingly.

13. The nozzle assembly group according to claim 1, wherein the flow control comprises at least one chosen from a passive valve appliance controllable depending on the pressure and an electrically controllable active valve appliance.

* * * * *